(12) United States Patent
Saarnisto et al.

(45) Date of Patent: Jan. 9, 2024
(10) Patent No.: US 11,868,520 B2

(54) RENDERING CONTENT

(71) Applicant: Nokia Technologies Oy, Espoo (FI)

(72) Inventors: Niko Saarnisto, Tampere (FI); Miikka Vilermo, Siuro (FI); Jussi Leppänen, Tampere (FI); Jukka Holm, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/487,596

(22) PCT Filed: Feb. 20, 2018

(86) PCT No.: PCT/FI2018/050120
§ 371 (c)(1),
(2) Date: Aug. 21, 2019

(87) PCT Pub. No.: WO2018/154178
PCT Pub. Date: Aug. 30, 2018

(65) Prior Publication Data
US 2020/0057493 A1 Feb. 20, 2020

(30) Foreign Application Priority Data
Feb. 23, 2017 (EP) ..................... 17157594

(51) Int. Cl.
G06F 3/01 (2006.01)
G02B 27/01 (2006.01)
G06T 19/00 (2011.01)

(52) U.S. Cl.
CPC ........... *G06F 3/013* (2013.01); *G02B 27/017* (2013.01); *G06F 3/012* (2013.01); *G06T 19/006* (2013.01); *G02B 2027/0138* (2013.01); *G02B 2027/0141* (2013.01); *G06F 3/011* (2013.01)

(58) Field of Classification Search
CPC .......... G06F 3/013; G06F 3/012; G06F 3/011; G02B 27/017; G02B 2027/0138; G02B 2027/0141; G06T 19/006
See application file for complete search history.

(56) References Cited

U.S. PATENT DOCUMENTS

| 2007/0245376 | A1* | 10/2007 | Svendsen | H04N 21/6125 725/46 |
| 2012/0206452 | A1 | 8/2012 | Geisner et al. | |
| 2012/0300061 | A1 | 11/2012 | Osman et al. | |
| 2013/0080522 | A1* | 3/2013 | Ren | H04W 12/08 709/204 |

(Continued)

OTHER PUBLICATIONS

"Snapchat", Wikipedia, Retrieved on Aug. 19, 2019, Webpage available at : https://en.wikipedia.org/wiki/Snapchat.

(Continued)

*Primary Examiner* — Nitin Patel
*Assistant Examiner* — Saifeldin E Elnafia
(74) *Attorney, Agent, or Firm* — ALSTON & BIRD LLP

(57) ABSTRACT

A method comprising: rendering, in a first state, any portion of content for rendering that is not defined as restricted content and rendering, in a second state, different to the first state, any portion of the content for rendering that is defined as restricted content; and using a combination of a user perception direction and an observation field of perception to define restricted content.

18 Claims, 3 Drawing Sheets

(56) References Cited

U.S. PATENT DOCUMENTS

| | | | |
|---|---|---|---|
| 2014/0068755 A1* | 3/2014 | King | G06F 3/04883 726/19 |
| 2014/0252205 A1* | 9/2014 | Tanaka | H04N 5/378 250/208.1 |
| 2014/0327613 A1* | 11/2014 | Chessa | H04N 13/279 345/156 |
| 2014/0361977 A1* | 12/2014 | Stafford | G06F 3/013 345/156 |
| 2015/0139426 A1* | 5/2015 | Tammi | H04R 3/005 381/17 |
| 2015/0309316 A1 | 10/2015 | Osterhout et al. | |
| 2016/0093105 A1 | 3/2016 | Rimon et al. | |
| 2016/0131908 A1* | 5/2016 | Fateh | G06F 3/016 345/633 |
| 2016/0133170 A1 | 5/2016 | Fateh | |
| 2016/0232336 A1* | 8/2016 | Pitschel | H05K 999/99 |
| 2018/0061084 A1* | 3/2018 | Mitchell | A63F 13/21 |
| 2018/0227630 A1* | 8/2018 | Schmidt | H04N 21/44008 |

OTHER PUBLICATIONS

"Image Reveal (Spotlight) FX—Adobe Muse Widget", Youtube, Retrieved on Aug. 19, 2019, Webpage available at : https://www.youtube.com/watch?v=YVD32NupWCE.

"College students explain why they love Snapchat so much", Business Insider, Retrieved on Aug. 19, 2019, Webpage available at : http://www.businessinsider.com/study-why-young-people-love-snapchat-2016-3?r=US&IR=T&IR=T.

Extended European Search Report received for corresponding European Patent Application No. 17157594.7, dated Aug. 2, 2017, 7 pages.

International Search Report and Written Opinion received for corresponding Patent Cooperation Treaty Application No. PCT/FI2018/050120, dated Apr. 26, 2018, 10 pages.

Office action received for corresponding European Patent Application No. 17157594.7, dated May 22, 2019, 5 pages.

Here's how Snapchat's new Spectacles will work [online] [retrieved May 13, 2020]. Retrieved via the Internet: https://www.theverge.com/2016/9/24/13042640/snapchat-spectacles-how-to-use (dated Sep. 24, 2016) 7 pages.

Spectacles [online] [retrieved May 13, 2020]. Retrieved via the Internet: web.archive.org/web/20170201120104/https://www.spectacles.com/ (dated 2017) 7 pages.

Office Action for European Application No. 17 157 594.7 dated Jun. 16, 2020, 4 pages.

Office Action for European Application No. 17157594.7 dated Jun. 14, 2022, 4 pages.

Office Action for European Application No. 17157594.7 dated Mar. 31, 2023, 3 pages.

* cited by examiner

RENDERING CONTENT

RELATED APPLICATION

This application was originally filed as Patent Cooperation Treaty Application No. PCT/FI2018/050120 filed Feb. 20, 2018, which claims priority benefit to EP Patent Application No. 17157594.7, filed Feb. 23, 2017.

TECHNOLOGICAL FIELD

Embodiments of the present invention relate to rendering content and to rendering content in dependence upon a user perception direction.

BACKGROUND

In some situations, it may be desirable to render content to a user in dependence upon a user perception direction.

For example, when a sound scene is rendered to a listener through a head-mounted audio output device, for example headphones using binaural audio coding, it may be desirable for the rendered sound space, the virtual space, to remain fixed in real space when the listener turns their head in space.

In some situations, for example when a visual scene is rendered to a viewer through a head-monitored visual output device, for example a head-mounted display, it may be desirable for the rendered visual space, the virtual space, to remain fixed in real space when the viewer turns their head in real space. This means that the rendered visual space needs to be rotated relative to the head-mounted visual output device by the same amount in the opposite sense to the head rotation. The orientation of the rendered visual space tracks with the rotation of the viewer's head so that the rendered visual space remains fixed in space and does not move with the viewer's head.

In some examples these two approaches may be combined to create a multimedia virtual reality experience.

In these examples, the sound space and the visual space extend beyond what is perceived at any one time by a user. The user can, for example, explore the visual space and/or the sound space changing their perception direction, by rotating their head, and sampling different portions of the visual space and/or sound space.

BRIEF SUMMARY

According to various, but not necessarily all, embodiments of the invention there is provided a method comprising: rendering, in a first state, any portion of content for rendering that is not defined as restricted content and rendering, in a second state, different to the first state, any portion of the content for rendering that is defined as restricted content; and using a combination of a user perception direction and an observation field of perception to define restricted content.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: causing rendering, in a first state, any portion of content for rendering that is not defined as restricted content and rendering, in a second state, different to the first state, any portion of the content for rendering that is defined as restricted content; and using a combination of a user perception direction and an observation field of perception to cause definition or re-definition of restricted content.

According to various, but not necessarily all, embodiments of the invention there is provided an apparatus comprising:

means for rendering, in a first state, any portion of content for rendering that is not defined as restricted content and means for rendering, in a second state, different to the first state, any portion of the content for rendering that is defined as restricted content; and using a combination of a user perception direction and an observation field of perception to define restricted content.

According to various, but not necessarily all, embodiments of the invention there is provided a computer program that when run on a computer enables: rendering, in a first state, any portion of content for rendering that is not defined as restricted content and rendering, in a second state, different to the first state, any portion of the content for rendering that is defined as restricted content; and using a combination of a user perception direction and an observation field of perception to define restricted content.

According to various, but not necessarily all, embodiments of the invention there is provided examples as claimed in the appended claims.

BRIEF DESCRIPTION OF FIGURES

For a better understanding of various examples that are useful for understanding the detailed description, reference will now be made by way of example only to the accompanying drawings in which.

DETAILED DESCRIPTION

In the following examples, a record is kept of which content, whether visual content and/or sound content, has been observed by a user. Content is information that is expressed through rendering in a form perceivable by the human senses of hearing (audio content), sight (visual content) or touch (haptic content): What is subsequently observable by a user may be reduced or restricted in dependence upon what has been recorded as observed by the user.

In this way, the information content that is available to a user will diminish over time. While content that has not yet been observed may retain its full information, content that has been observed may be adapted to lose information. This may allow a composer of the original content to control observation of the visual content and/or sound content. For example, in some but not necessarily all examples content that has been observed once may no longer be observable.

In the context of a virtual space (visual space and/or sound space) that is greater than what is observable by a user at any particular time, portions of the virtual space that have been observed are adapted so that they are no longer observable as initially observed, while unobserved portions of the virtual space remain for observation, in the future, by the user without adaptation. A virtual space is space defined by content that has a position within a space. The user's perspective (point of view) within the virtual space (and/or, optionally, the user's position within the virtual space) define what content is observed by a user. Changing the user's perspective (point of view) within the virtual space (and/or optionally changing the user's position within the virtual space) change what portion of the content is observed by a user.

The user perception direction may be measured in many different ways. Any technology that tracks the point of view of the user (head orientation and/or gaze direction) may be used. For example, accelerometers or gyroscopes comprised in a headset may track the movement and orientation of a headset and thus the movement and orientation of the user's head and thus the movement and orientation of the user's point of view.

Figure 1A:
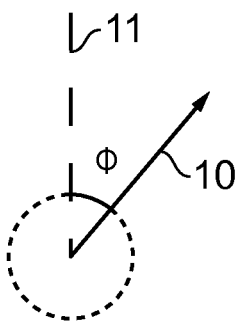
FIGS. 1A and 1B illustrate an example of a user perception direction.
Figure 1B:
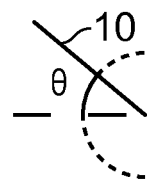

FIGS. 1A and 1B illustrate an example of a user perception direction 10. In this example FIG. 1A illustrates, from a top perspective view, a component of the perception direction 10 in a horizontal plane (plane of paper) and FIG. 1B illustrates, from a side perspective view, a component of the perception direction 10 in a vertical plane (plane of paper). In FIG. 1A, the user perception direction 10 is defined by an azimuthal angle φ offset, in this example, from a vertical reference plane through a horizontal reference direction 11. The azimuthal angle φ rotates the user perception direction up to +/−180° relative to the vertical reference plane parallel to the horizontal plane. In FIG. 1B, the user perception direction 10 is defined by a polar angle θ offset, in this example, from a horizontal reference plane through the horizontal reference direction 11. The polar angle offset rotates the user perception direction up to +/−45° out of the horizontal reference plane. In will be appreciated that the azimuthal angle and polar angle are the defined in accordance with the convention for spherical polar co-ordinates and that other co-ordinate system may be used.

Figure 2A:
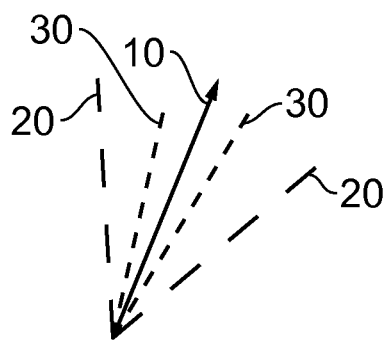
FIGS. 2A and 2B illustrate an observation field of perception and a rendering field of perception relative to the user perception direction.
Figure 2B:
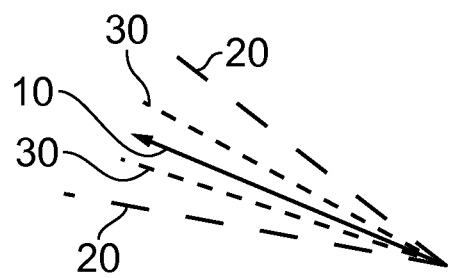

FIGS. 2A and 2B illustrate a cross-section through an observation field of perception 30 and a rendering field of perception 20.

A virtual space is space defined by content that has a position within a space. The user's perception direction 10 (point of view) within the virtual space define a position of the rendering field of perception 20 within the virtual space. The position of the rendering field of perception 20 within the virtual space determines what content is present in the rendering field of perception 20. Changing the user's perception direction 10 (point of view) within the virtual space changes the position of the rendering field of perception 20 within the virtual space and consequently changes what portion of the content is observed by a user.

In this example, the cross-section may be through the perception direction 10 and parallel to the vertical plane or, alternatively, the cross-section may be through the perception direction 10 and parallel to the horizontal plane.

The observation field of perception 30 and a rendering field of perception 20 are areas in a plane orthogonal to the perception direction 10. In one example, the observation field of perception 30 and the rendering field of perception 20 are rectangles in a plane orthogonal to the perception direction 10. However, other geometries are possible for defining the two-dimensional observation field of perception 30 and the two-dimensional rendering field of perception 20.

Both the observation field of perception 30 and the rendering field perception 20 are determined by the user perception direction 10. In these examples, the observation field of perception 30 and the rendering field perception 20 are both centered on the user perception direction 10.

The rendering field of perception 20 is equivalent to a field of view for rendered content, but the use of the term 'perception' indicates that the field and content is not necessarily limited to only visual content. For example, changing the user's perception direction 10 (point of view) within a virtual space changes the position of the rendering field of perception 20 within the virtual space and consequently changes what portion of the content is observed by a user. The visual content observable by a user is framed by the rendering field of perception 20 at a position determined by the user's perception direction 10 (point of view).The audio content observable by a user is determined by the rendering field of perception 20 at a position determined by the user's perception direction 10 (point of view) and/or audio content observable by a user is determined by the user's perception direction 10 (point of view) and not the rendering field of perception 20. In some example embodiments, audio content observable by a user is audio coming from in front of the user and/or audio associated with an object in front of a user.

In some but not necessarily all examples, the rendering field of perception 20 is one of multiple different rendering fields of perception (defined by different user perception directions 10) that partially overlap to cover a visual scene that extends horizontally and vertically. The visual scene subtends, in the horizontal plane, an angle that may be greater than 180° for example it may be 360°. The visual scene subtends, in the vertical plane, an angle that may be greater than 60°, for example it may be 180°.

Figure 3A:
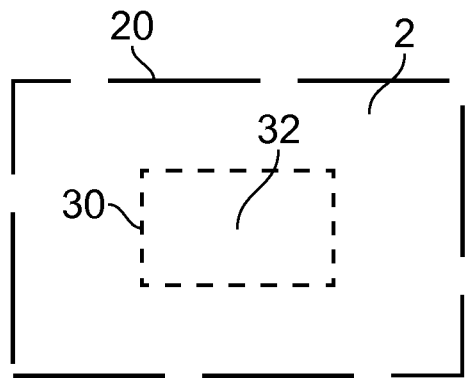
FIG. 3A illustrates rendered content defined by the combination of the user perception direction and the rendering field of perception and observed content defined by the combination of the user perception direction and the observation field of perception.

As illustrated in FIG. 3A, the combination of the user perception direction 10 and the rendering field of perception 20 define content 2 for rendering. The combination of the user perception direction 10 and the observation field of perception 30 define observed content 32.

As previously described, a virtual space is space defined by content that has a position within a space. The user's perspective (point of view) within the virtual space (and/or, optionally, the users position within the virtual space) define what (portion of the) content is observed by a user (but does not necessarily define that content). Changing the user's perspective (point of view) within the virtual space (and/or optionally changing the user's position within the virtual space) changes what (portion of the) content is observed by a user (but does not necessarily change the content).

The rendering field of perception 20 defines (determines) what portion of possible content is rendered and therefore what is or can be perceived from that perception direction 10. The observation field of perception 30 defines what is considered to be observed from that perception direction 10. In this example, the observation field of perception 30 is smaller than the rendering field of perception 20 and is centered within the rendering field of perception 20. This arrangement is based upon a model that assumes that a user focuses mostly on what content (visual content or audio content) is directly in front of the user. However, other arrangements are possible and the size and potion of the observation field of perception 30 may be defined other than by using the observation field of perception 30 and the perception direction 10. The observation field of perception 30 may be smaller than or the same size as the rendering field of perception 20. The observation field of perception 30 may be positioned anywhere within a boundary of the rendering field of perception 20.

Figure 3B:
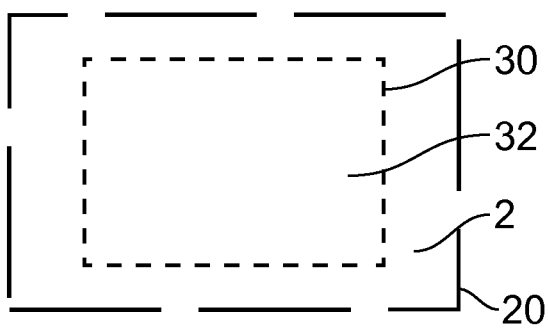
FIG. 3B illustrates rendered content defined and observed content defined by different rendering field of perception and/or observation field of perception.

For example, although FIG. 3A illustrates a relationship between the size of the observation field of perception 30 and the rendering field of perception 20, in other examples one or more of the rendering field of perception 20 and the observation field of perception 30 may be rescaled to have a different dimension, for example as illustrated in FIG. 3B. The observation field of perception 30 is smaller than the rendering field of perception 20 in at least one direction, in this example the observation field of perception 30 is less than the rendering field of perception 20 in all directions.

Figure 4:
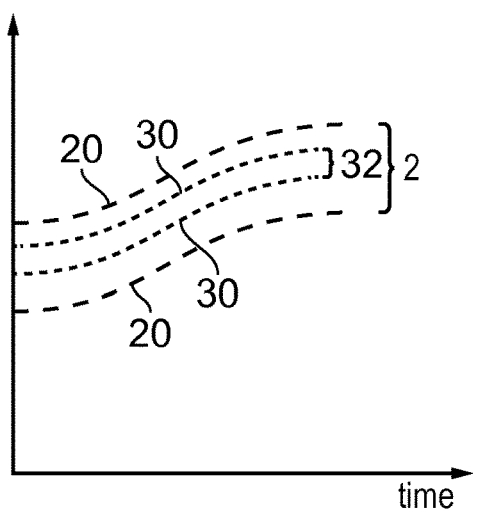
FIG. 4 schematically illustrates a time evolution of the defined observed content and the defined content for rendering as a user perception direction varies over time.

FIG. 4 schematically illustrates time evolution of the defined observed content 32 and the defined content 2 for rendering as a user perception direction 10 varies over time. Although, for the sake of convenience of illustration the content is displayed on a notional single 'content' axis that maps non-overlapping content to a different value, alternatively the single content axis may be multiple orthogonal axes.

As an example, content in a three-dimensional space may have value C(x,y,z) where (x, y, z) represents a position in the space. The position in three-dimensional space map be mapped to a one dimensional space ¥, and the content in the one-dimensional space has value C'(¥).

As an example, pixels in a head-up display may have a values P(x,y) where x represents a column address and y represents a row address. There may be N columns (0≤x≥N) and M rows (0≤y≥M), giving NM pixels in total. Each pixel value may be represented as a value in a two dimensional space (x.y), alternatively each pixel value may be represented as a value in a one dimensional space, a single content axis ¥, where ¥=(y−1)·N+x.

In this example embodiment the observation field of perception 30 and the rendering field of perception 20 remain of constant size and shape. However this is not essential and in other example embodiments one or both of the observation field of perception 30 and the rendering field of perception 20 may vary in time.

In this example embodiment the time axis is plotted horizontally and the content that can be rendered is plotted schematically along a vertical axis. It should be appreciated that for fixed content the content is fixed and there is a common fixed y-axis (y) for all time but for time-variable content the content varies with time and there is a different time-dependent axis y(t) for different times where different content is available.

It will be appreciated that at any point in time, the content 2 for rendering represents only a subset of all the content that is available for rendering across all perception directions 10.

As the user perception direction 10 varies in time the content 2 for rendering changes with the user perception direction 10 and the observation field of perception 30 also changes with the user perception direction 10.

Portions of the virtual space that have been observed are adapted so that they are no longer observable as initially observed, while unobserved portions of the virtual space remain for observation, in the future, by the user without adaptation In this way, the information content that is available to a user will diminish over time. While content that has not yet been observed may retain its full information, content that has been observed may be adapted to lose information.

When the content 2 for rendering is first rendered all of that content 2 is rendered in a non-adapted (non-restricted) form.

Figure 5A:
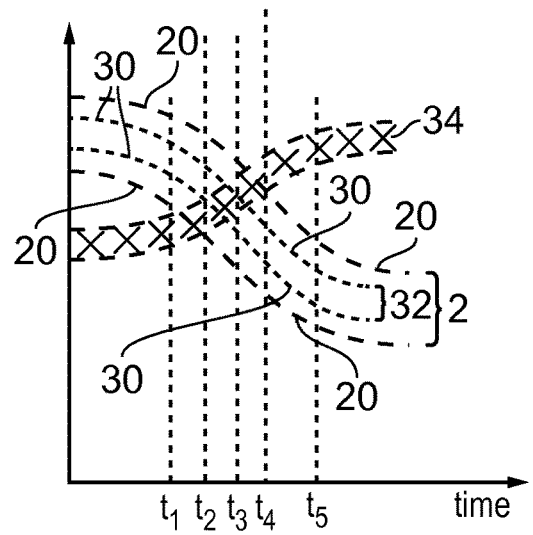
FIG. 5A schematically illustrates a time evolution of defined observed content and the defined content for rendering as a user perception direction varies over time.

The content 2 when first rendered includes content within the observation field of perception 30. Once content is rendered within the observation field of perception 30 it is considered observed and the content rendered within the observation field of perception 30 is observed content 32. Once observed, the observed content 32 within the observation field of perception 30 may be designated in whole or in part as restricted content. Once content is designated as restricted, its use may be restricted, for example as illustrated in FIG. 5A.

In some examples, all of the observed content is designated as restricted content. In other examples a part of the observed content is designated restricted content. For example, only observed content that relates to foreground objects may be designated restricted content and/or for example, only observed content that relates to key objects (e.g. person, animal, particular person etc) may be designated restricted content.

A log may be stored in a memory recording what content 2 for rendering has been designated restricted content 34.

Observed content 32 may be designated as restricted content 34 when a threshold is exceeded or based on satisfaction of some other criterion or criteria. The threshold for designating observed content 32 as restricted content 34 may, for example, be based upon a number N (N≥1) of distinct times content has been observed content 32 or based on a cumulative duration content has been observed content 32. A distinct time may be a time separated from a preceding time by a minimum time duration or may be a time in a different session or may be a time separated from a preceding time by a minimum time duration and that is in a different session. A session is a period of persistent use without interruption it may, for example, be a content session (rendering of the same specific content only) or may be an application session (instantiation of the rendering application).

It may also be desirable to dynamically restrict content, for example, to motivate a user to look in a particular direction for a particular duration.

FIG. 5A schematically illustrates a time evolution of defined observed content 32 and the defined content 2 for rendering as a user perception direction 10 varies over time. Although, for the sake of convenience of illustration the content is displayed on a notional single 'content' axis that maps non-overlapping content to a different value, alternatively the single content axis may be multiple orthogonal axes.

As the user perception direction 10 varies in time, the content 2 for rendering changes with the user perception direction 10 and the observation field of perception 30 also changes with the user perception direction 10.

In this example, as in FIG. 4, the observation field of perception 30 and the rendering field of perception 20 remain of constant size and shape. However, this is not essential and in other examples one or both of the observation field of perception 30 and the rendering field of perception 20 may vary in time. In this example, as in FIG. 4, the time axis is plotted horizontally and the content that can be rendered is plotted schematically along a vertical axis. It should be appreciated that for fixed content (e.g. a photograph) the content is fixed (unchanging) and there is a common fixed y-axis (y) for all time but for time-variable content (e.g. a video with or without audio or a photograph wilt audio) the content varies with time (e.g. different video/audio frames have different content) and there is a different time-dependent axis y(t) for different times where different content (e.g. different video/audio frames) is available.

It will be appreciated that at any point in time, the content 2 for rendering represents only a subset of all the content that is available for rendering across all perception directions 10.

Figure 5B:
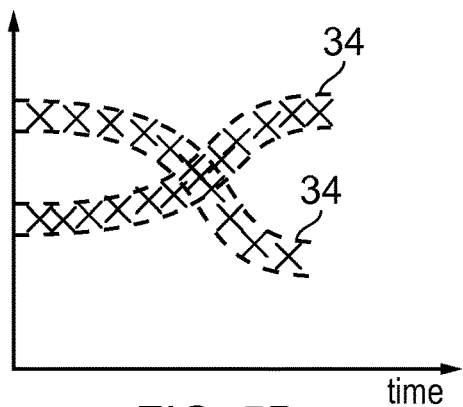
FIG. 5B illustrates an example of multiple different time-evolutions of restricted content determined at different times being combined to provide a composite version of restricted content.

FIG. 5A differs from FIG. 4 in that the time evolution of the defined observed content 32/defined content 2 for rendering varies differently over time compared to the preceding time evolution of the defined observed content 32/defined content 2 for rendering illustrated in FIG. 4. Although the time evolution illustrated in FIG. 5 is at a later time compared to FIG. 4, where the content is time-variable, the time axis has been calibrated for the purposes of this illustration with respect to the same start time of the content so that the y-axis of FIG. 4 and FIG. 5 are synchronized, as they vary in time. The time evolution of the defined observed content 32/the defined content 2 for rendering illustrated in FIG. 4 and FIG. 5B are therefore comparable as they are measured and illustrated in the same way.

Figure 5C:
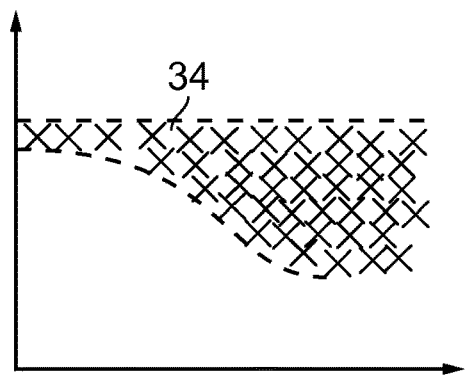
FIG. 5C illustrates an example in which when content has been designated as restricted content that same or similar content is designated restricted content for subsequent times.

The time evolution of the content 32 arises when content, with audio content or visual content, changes over time. Each time slice has particular content that differs from time slice to time slice. If content is observed in a particular time slice it may be designated as observed content for that time slice only (FIG. 5A) or designated as observed content for all future time slices (FIG. 5C).

FIG. 5A differs from FIG. 4 in that the previous time evolution of defined observed content 32 illustrated in FIG. 4 has been designated as restricted content 34 in FIG. 5A (illustrated using cross-hatching). FIG. 5A therefore illustrates a time evolution of restricted content 34 that corresponds to the time-evolution of the observed content in FIG. 4.

FIG. 5A illustrates the current content 2 for rendering defined by the perception direction 10 and the rendering field of perception 20 and also the observation field of perception 30 that defines observed content 32. Where the current content 2 for rendering does not overlap with the restricted content 34, then the current content 2 for rendering is rendered in a first state 41. However, where the content 2 for rendering overlaps with the restricted content 34, that content 2 is rendered in a second state 42, different to the first state 41.

In this example, the time evolution of the restricted content 34 exactly corresponds to the time-evolution of the observed content 32. However, in other examples the time evolution of the restricted content 34 may be dependent upon but may not exactly match the time-evolution of the observed content 32. For example, in some examples time evolution of the restricted content 34 encompass the time-evolution of the observed content 32 but extends to a limited extent beyond the time-evolution of the observed content 32 in a manner that is variable in time and is context-dependent and/or content-dependent.

In an example embodiment, there is a 1 minute long video. First a user looks in direction A for the first 10 seconds observing content C(A[0-10]), then in a direction B for 10-30 seconds observing content C(B[10-30] and rest of the video to the direction A again observing content C(A [30-60]). During this first session, the content C(A[0-10]), C(B[10-30] and C(A[30-60]) is not restricted. However, in this example after a single viewing session the observed content becomes restricted. When the user looks at the same video again in a different session, the viewing direction A is restricted between 0-10 seconds and between 30-60 seconds, the content C(A[0-10]) and C(A[30-60]) is restricted, also the viewing direction B is restricted between 10-30 seconds, the content C(B[10-30]) and is restricted.

Applying a similar example to FIGS. 4 and 5A, there is a 1 minute long video. The content may be plotted as a time on the x-axis and a direction on the y-axis. A user looks in direction A at x seconds observing content C(A[x]). This corresponds to the observed content 32 occupying point (x,A) in FIG. 4. Then the user looks in a direction other than A (not A) until y seconds observing content C(B[x->y]) where B(t)=Ā. This corresponds to the observed content 32 occupying points (x<t<y, B(t)) in FIG. 4. Then the user looks in direction A again observing content C(A[y]). This corresponds to the observed content 32 occupying point (y, A) in FIG. 4. During a first session (FIG. 4), the content C(A[x]), C(B[x->y]) and C(A[y]) is not restricted. However, in this example after a single viewing session, the observed content including C(A[x]) and C(A[y]), becomes restricted content 34 (FIG. 5A). When the user looks at the same video again in a different session (FIG. 5A), the viewing direction A is restricted at x seconds and y seconds, the content C(A[x]) and C(A[y]) is restricted content 34, also the viewing direction B(t) is restricted between x-y seconds, the content C(B [x->y]) is restricted content 34.

FIG. 5B illustrates an example embodiment of multiple different time-evolutions of restricted content 34 determined at different times being combined to provide a composite version of restricted content 34. Although, for the sake of convenience of illustration the content is displayed on a notional single 'content' axis that maps non-overlapping content to a different value, alternatively the single content axis may be multiple orthogonal axes.

FIG. 5C illustrates an example embodiment in which, when content has been designated as restricted content 34, the same or similar content is designated restricted content 34 for subsequent times. This may, for example, be achieved by using computer vision to identify portions of subsequent content that correspond to content previously designated as restricted 34. This may, for example be achieved by using feature extract and comparison or other techniques. Although, for the sake of convenience of illustration the content is displayed on a notional single 'content' axis that maps non-overlapping content to a different value, alternatively the single content axis may be multiple orthogonal axes.

Figure 6:
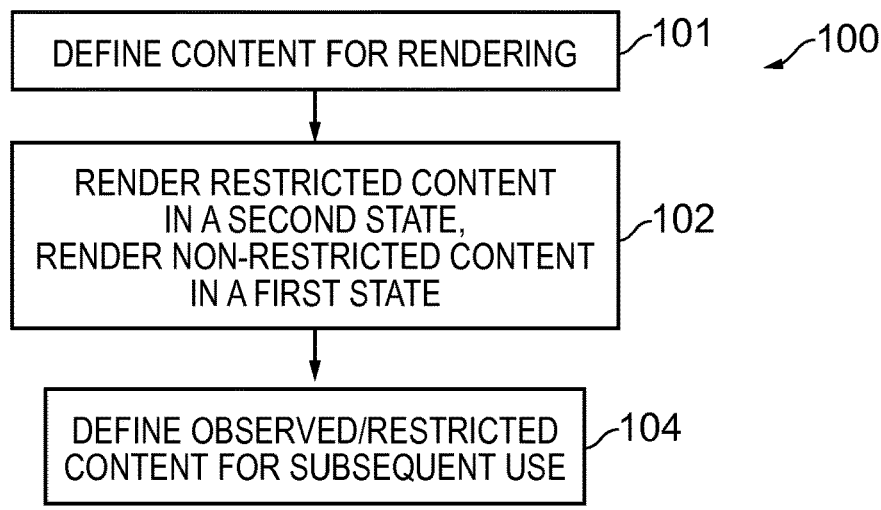
FIG. 6 illustrates an example of a method for rendering content.

FIG. 6 illustrates an example of a method 100 for rendering content. At block 102, the method comprises rendering in a first state 41 any portion of the content 2 for rendering that is not defined as restricted content 34 and rendering in a second state 42, different to the first state 41 any portion of the content 2 for rendering that is defined as restricted content 32.

At block 104, the method 100 comprises using a combination of the user perception direction 10 and an observation field of perception 30 to define restricted content 34. This definition of restricted content 34 is used for later iterations of the method 100 at block 102.

At a first time, content 2 may be rendered in a first state 41. The rendered content 2 that falls within the observation field of perception 32 positioned by the user perception direction 10 is observed content 32. The observed content, as it has now been observed, may be designated restricted content 34. Subsequently, that restricted content 32, when rendered, is rendered in a second state 42, different to the first state 41.

As the method 100 iterates, the restricted content 34 will typically increase with each iteration.

The method also illustrates at block 101, using a combination of a user perception direction 10 and a rendering field of perception 20 to define content 2 for rendering.

In block 102, observed content 32 may be designated as restricted content 34 when a threshold is exceeded. The threshold for designating observed content 32 as restricted content 34 may, for example, be based upon a number N (N≥1) of distinct times content has been observed content 32 or based on a cumulative duration content has been observed content 32.

In one example, each rendering up to and including an $N^{th}$ rendering of the observed content 32 is in the first state 41 and each rendering after and including an $(N+1)^{th}$ rendering of the observed content 32 is in the second state 42. In another example, a first rendering of the observed content 32 is in a first state 41 when the observed content 32 is first observed and any subsequent rendering of the observed content 32 is in the second state 42. Subsequent rendering may require there to be a delay of at least a predetermined duration.

FIGS. 7A to 7E and FIG. 8 illustrate example embodiments of rendered content 2. In these examples, the rendered content is visual content, however, a similar description is applicable for sound content.

The figures illustrate rendering in a first state 41 any portion of content 2 for rendering that is not defined as restricted content 34 and rendering in a second state 42, different to the first state 41 any portion of the content 2 for rendering that is defined as restricted content 34. It should be appreciated that when there is rendering in a second state 42, different to the first state 41 of at least portion 34 of the content 2 (the restricted content) there is simultaneous rendering in a first state 41 of at least one portion of the content 2 (the un-restricted content).

The second state 42 is constrained relative to the first state 41. For example, the second state 42 has less information content than the first state 41. Where the content 2 is sound content, the second state 42 may indicate that the sound content has a lower volume or is muted. Where the content 2 is visual content, the second state 42 may for example indicate that the content is obscured, removed or otherwise modified, for example de-focused or blurred.

Figure 8:
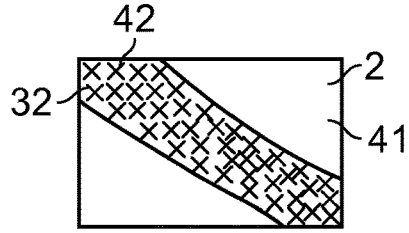
FIG. 8 illustrates an example of rendered static content according to the method.

FIG. 8 illustrates an example embodiment in which the content 2 is fixed content, for example, a still image. The content is visual content 2 that is static and does not vary in time. In this example embodiment, a combination of the user perception direction 10 and an observation field of perception 30 over a cumulative viewing time or cumulative number of sessions is used to define restricted content 34 in the still image. For example, referring to FIG. 5, the restricted content 34 of the still image is defined by the projection onto the y axis of the observed content 32 over time, as the time at which the content is observed is irrelevant for a still image. The method 10 then uses a combination of a user perception direction 10 and a display field of view 20 to define visual content for display, displays in a first state 41 any portion of the visual content 2 for display that is not defined as restricted visual content 2 and displays in a second state 42, different to the first state 41, any portion of the visual content 2 for display that is defined as restricted content 34 and uses a combination of the user perception direction 10 and an observation field of view 30 to define observed content 32 for this viewing which may be used to define restricted content 34 for subsequent views.

FIGS. 7A to 7E illustrate the rendering of time-varying content 2. Each of FIGS. 7A to 7E corresponds to a time $t_1$ to $t_5$ as illustrated in FIG. 5. In this example, as the content 2 is time varying, the content itself is defined by the relative time, during playback, at which it is rendered.

Figure 7A:
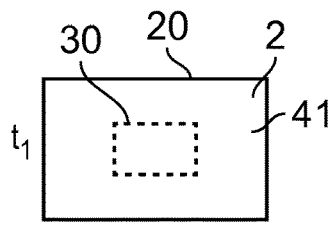
FIGS. 7A to 7E illustrates an example of rendering of time-varying content according to the method.
Figure 7B:
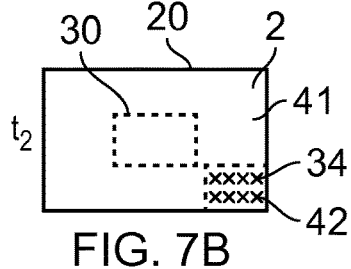
Figure 7C:
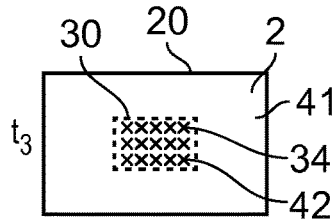
Figure 7D:
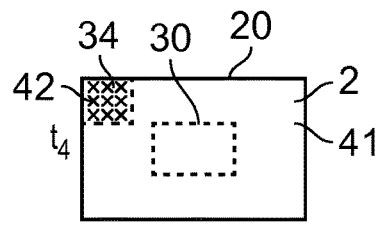
Figure 7E:
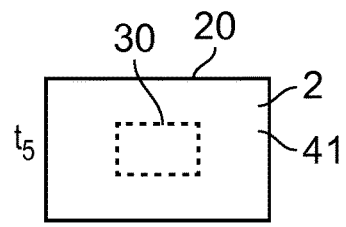

Each of FIGS. 7A to 7E corresponds to a time $t_1$ to $t_5$ as illustrated in FIG. 5. However, the times $t_1$ to $t_5$ are merely illustrative and the time-varying content 2 may additionally be rendered at times intermediate of times $t_1$ to $t_5$. In the specific example illustrated in FIGS. 7A-7E, the user perception direction 10 moves over times $t_1$ to $t_5$ towards the bottom right, causing the current content 2 for rendering defined by the perception direction 10 and the rendering field of perception 20 to move towards the top left. The region of overlap, between the current content 2 for rendering and the restricted content 34, that is rendered in the second state 42, therefore enters bottom right and traverses the field of perception 20 towards the top right. In the example of FIG. 7C it happens to coincide with the observation field of perception 30 but this is not necessary. The position of the restricted content 34 in the second state 42 varies with the perception direction 10 and it may entirely avoid the observation field of perception 30 or partially fill the observation field of perception 30 depending upon the user perception direction 10.

The time-varying content 2 comprises different content 2 at different relative times t.

The method 100 comprises: using a combination of a user perception direction 10 at a relative time $t_n$ and a rendering field of perception 20 to define content 2 for rendering at the relative time $t_n$; and rendering in a first state 41 at the relative time $t_n$ any portion of the content 2 for rendering that is not defined as restricted content 34 and rendering in a second state 42 at the relative time $t_n$, different to the first state 41, any portion of the content 2 for rendering that is defined as restricted content 34.

The combination of the user perception direction 10 and an observation field of perception define observed content 32 at the relative time $t_n$. The observed content 32 may be used to define restricted content 34 for subsequent times $t_m$ (m>n).

In some examples, the time-varying content 2 may be a video comprising time-varying images at different relative times $t_n$.

As previously described above, in some but not necessarily all examples, the rendering field of perception 20 is one of multiple different rendering fields of perception (defined by different user perception directions 10) that partially overlap to cover a visual scene that extends horizontally and vertically. The visual scene subtends, in the horizontal plane, an angle that may be greater than 180° for example it may be 360°. The visual scene subtends, in the vertical plane, an angle that may be greater than 60°, for example it may be 180°.

In the illustrated examples of FIGS. 7A to 7E and FIG. 8, the content 2 for rendering is visual content. For visual content, the rendering field of perception 20 may be a front field of view for the user. The second state may, for example, be a state that is less visible relative to the first state 41. For example it may obscure content, remove content or blur content.

The method 100 may, for example, comprise: using a combination of the user perception direction 10 at a first relative time and a display field of view 20 to define visual content 2 for display at the first time; displaying in a first state 41 at the first relative time any portion of the visual content 2 for display that is not defined as restricted visual content and displaying in a second state 42, different to the first state 41, at the first relative time any portion of the visual content 2 for display that is defined as restricted visual content 34; and using a combination of the user perception direction 10 and an observation field of view 30 to define observed visual content 32 at the first relative time. This definition of observed visual content 32 may be used to update a definition of restricted visual content 34. This updated definition of restricted visual content 34 is used for later iterations of this method 100. As the method 100 iterates, the restricted content 34 will typically increase with each iteration.

Although in the example embodiments of FIGS. 7A to 7E, the content 2 for rendering is visual content, in these example embodiments and in other example embodiments the time-varying content 2 for rendering may be sound content. For sound content, the rendering field of perception 20 may be a front field of hearing for the user. The second state may, for example, be a state that is less audible relative to the first state 41. For example, it may obscure content, remove content or have a lower intensity/volume or may be muted.

The method 100 may, for example, comprise: using a combination of the user perception direction 10 at a first relative time and a front field of hearing 20 to define sound content 2 for rendering at the first relative time; rendering in a first state 41 at the first relative time any portion of the sound content 2 for rendering that is not defined as restricted content and rendering in a second state 42, different to the first state 41, at the first relative time any portion of the sound content 2 for rendering that is defined as restricted sound content 34; and using a combination of the user perception direction 10 and an observation field of hearing 30 to define observed content 32 at the first relative time. This definition of observed sound content 32 may be used to update a definition of restricted sound content 34. This updated definition of restricted sound content 34 is used for later iterations of this method 100. As the method 100 iterates, the restricted sound content 34 will typically increase with each iteration.

In one example embodiment, there is a 1 minute long video. First a user looks in direction A for the first 10 seconds observing content C(A[0-10]), then immediately in a direction B for 10-30 seconds observing content C(B[10-30] and then immediately in the direction A again until the end of the video observing content C(A[30-60]). During this first session, the content C(A[0-10]), C(B[10-30] and C(A [30-60]) is not restricted. However, in this example after a single viewing session the observed content becomes restricted. When the user looks at the same video again in a different session, the viewing direction A is restricted between 0-10 seconds and between 30-60 seconds, the content C(A[0-10]) and C(A[30-60]) is restricted, also the viewing direction B is restricted between 10-30 seconds, the content C(B[10-30]) and is restricted.

In the example embodiments illustrated in FIGS. 7A to 7E and FIG. 8, content is designated as restricted content irrespective of its location within the rendering field of perception 20. In other example embodiments, content may be conditionally designated as restricted content such that it is treated as restricted content only when it occupies a certain location within the rendering field of perception 20. For example, content for rendering may only be restricted content if it occupies a defined area in a plane orthogonal to the perception direction 10. For example, a whole collection of content (e.g. a visual object) for rendering may be restricted content if one part of the collection occupies a defined area in a plane orthogonal to the perception direction 10. For example, a whole collection of content (e.g. a visual object) for rendering may be restricted content only if all of the collection occupies a defined area in a plane orthogonal to the perception direction 10. In some or all of these examples, the defined area may be centered on the perception direction 10. In some or all of these examples, the defined area may be the same as the observation field of perception 30. Thus in some examples, the method 100 is as described above in relation to FIGS. 7A to 7E but the definition of the observed visual content 32 at the first relative time is used to update a definition of restricted visual content 34 that is dependent upon when and also where the visual content is rendered. As a consequence, examples such as those illustrated in FIGS. 7B and 7D, where there is restricted visual content 34 outside the defined area (e.g. the observation field of perception 30) may not occur.

Figure 9:
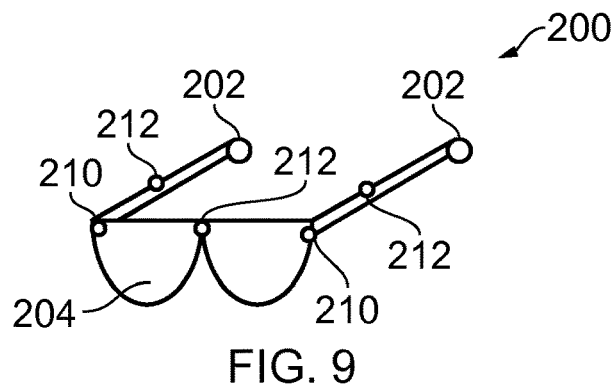
FIG. 9 illustrates an example of a headset that may be used for rendering content to a user in accordance with the method.

FIG. 9 illustrates an example embodiment of a headset 200 that may be used for rendering content to a user. The headset 200 may, for example, be used to render sound content and/or visual content.

When a sound scene is rendered to a listener through a headset 200 using binaural audio coding, it may be desirable for the rendered sound space, the virtual space, to remain fixed in real space when the listener turns their head in space. This means the rendered sound space needs to be rotated relative to the head-mounted audio output device by the same amount in the opposite sense to the head rotation. The orientation of the rendered sound space tracks with the rotation of the listener's head (user perception direction) so that the rendered sound space remains fixed in space and does not move with the listener's head. The system may use a transfer function to perform a transformation that rotates the sound objects within the sound space, for example, a head-related transfer function (HRTF) interpolator may be used for binaural audio. Vector-based amplitude panning, (VBAP) may be used for loudspeaker format (e.g. 5.1) audio.

In this example embodiment, sound content may be rendered using head mounted loudspeakers 202 at or near the user's ears and visual content may be displayed to a user using a head-mounted display 204.

The headset 200 may be configured to track the user perception direction 10. The headset may for example be configured to track head movement, suing for example inertial sensors such as accelerometers or gyroscopes. The headset may for example be configured to tracks eye movement (gaze direction) using a pupil detection system that measures pupil movement.

In some example embodiments, the headset 200 may additionally be used for recording sound content and/or visual content that may be provided to another user for operation of the method 100. For example, the headset 200 may comprise one or more cameras 210 and one or more microphones 212. The camera(s) 210 may be arranged to capture a wide field of view and the microphones 212 may be arranged to record a sound space with spatial diversity such that spatial audio processing can be performed.

The user of the headset may capture content 2 for rendering over a prolonged period by, for example, changing their head orientation such that they capture more than one visual scene and sound scene over time. This captured content 2 may be comprised within a message and sent via a transceiver 214 to another user with a similar headset 200.

The receiver who receives the message 200 via the transceiver 214 may then have that message rendered to them using the method 100 described above. In this way the originating user is able to send a message to another user that does not last indefinitely. Access to the content is restricted with use.

The sender of the message and the receiver of the message may use different example embodiments of the same apparatus 200.

In some example embodiments, the originating user may define via metadata settings that control the definition of observed content 32 and/or the thresholds for designating observed content 32 as restricted content and/or define the second state of the content and the extent to which it is restricted. For example, the originating user may specify that the content is for one view only.

Figure 10A:
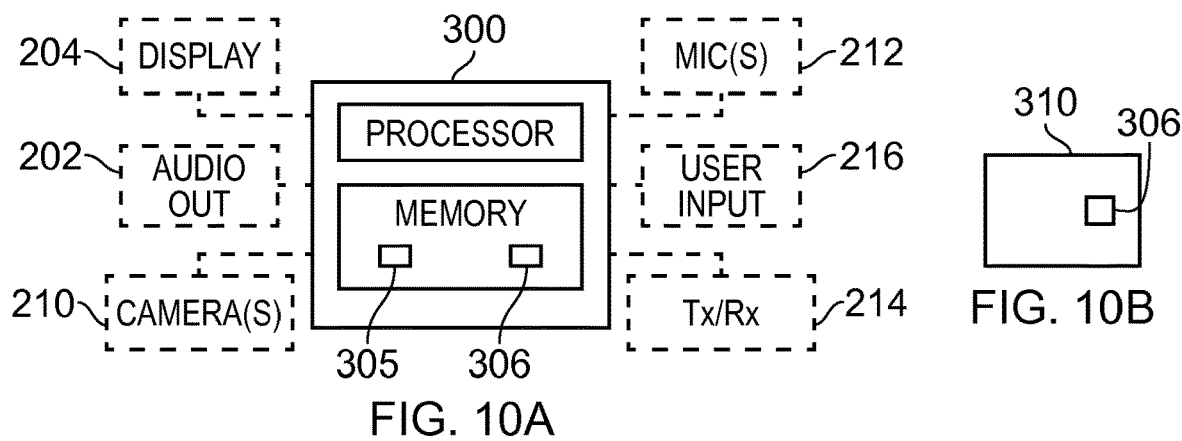
FIG. 10A illustrates an example of a controller suitable for performing the method.

FIG. 10A illustrates an example of a controller suitable for performing the method 100 described above.

Implementation of a controller 300 may be as controller circuitry. The controller 300 may be implemented in hardware alone, have certain aspects in software including firmware alone or can be a combination of hardware and software (including firmware).

As illustrated in FIG. 10A the controller 300 may be implemented using instructions that enable hardware functionality, for example, by using executable instructions of a computer program 306 in a general-purpose or special-purpose processor 302 that may be stored on a computer readable storage medium (disk, memory etc) to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 301 when loaded into the processor 302. The computer program instructions, of the computer program 306, provide the logic and routines that enables the apparatus to perform the methods illustrated in FIG. 6. The processor 302 by reading the memory 304 is able to load and execute the computer program 306.

The apparatus 301 therefore comprises:
at least one processor 302; and
at least one memory 304 including computer program code
the at least one memory 304 and the computer program code configured to, with the at least one processor 302, cause the apparatus 301 at least to perform:

causing rendering, in a first state, any portion of content for rendering that is not defined as restricted content and rendering, in a second state, different to the first state, any portion of the content for rendering that is defined as restricted content; and using a combination of a user perception direction and an observation field of perception to cause definition or re-definition of restricted content.

The apparatus 301, as previously described, may be a headset 200. The apparatus 301 may part of another type of rendering engine. The apparatus 301 may part of a system that controls a headset or other type of rendering engine.

The controller 300 may be part of an apparatus 200. The controller 300 may, for example, be configured to communicate with components of the apparatus 200 including, but not restricted to, one or more of: display 204, audio output 202 (e.g. loudspeaker), camera(s) 210, audio input 212 (e.g. microphones), user input interface 216 and transceiver 214. In some but not necessarily all examples, the user input interface 216 may track the user perception direction 10. It may for example comprise inertial sensors such as accelerometers or gyroscopes that track head movement or a pupil detection system that tracks eye movement (gaze direction).

The controller 300 may be configured to store a data structure 305 that records which content is restricted content. Preferably that data structure is not editable by the user but is only updated automatically as observed content is automatically designated as restricted content according to the methods described above. The data structure 305 may be stored locally in the memory 304 or may be stored remotely, using transceiver 214, at a remote server.

Figure 10B:
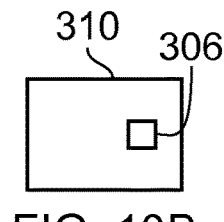
FIG. 10B illustrates an example of a computer program or performing the method.

As illustrated in FIG. 10B, the computer program 306 may arrive at the apparatus 301 via any suitable delivery mechanism 310. The delivery mechanism 310 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 306. The delivery mechanism may be a signal configured to reliably transfer the computer program 306. The apparatus 200 may propagate or transmit the computer program 306 as a computer data signal.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the Figs referred to above may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 330 may, for example, be a module.

The preceding description describes a number of processes and methods. Except where specifically excluded any or all of the processes or methods or steps in the processes or methods may be performed automatically by the controller 300.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory comprising computer program code, the at least one memory and the computer program code configured to, with the at least one processor, cause the apparatus to perform at least the following:
render for a user, in a first state, a first portion of content for rendering that is not defined as restricted content and render simultaneously, in a second state, different to the first state, a second portion of the content for rendering that is defined as restricted content, wherein the second portion of the content is rendered in the second state based on having been previously observed by the user a predefined number of times during a particular time slice of the content or having been previously observed by the user for a predefined cumulative viewing time during the particular time slice of the content;
wherein the restricted content comprises only a portion of all rendered content;
wherein the second state in which the second portion of the content is rendered provides for persistently obscuring, removing, de-focusing, blurring, rendering at a lower volume, muting or otherwise modifying the second portion of the content, while the content is subsequently viewed during the particular time slice, to contain less information relative to the first portion of the content; and
use a combination of a user perception direction and an observation field of perception to define restricted content.

2. An apparatus as claimed in claim 1, further caused to use a combination of the user perception direction and a rendering field of perception to define the content for rendering.

3. An apparatus as claimed in claim 2, wherein the rendering field of perception is one of multiple different rendering fields of perception that overlap to cover a visual scene that extends in a horizontal plane for at least 180° and in a vertical plane for at least 60°.

4. An apparatus as claimed in claim 1, wherein the observation field of perception is less than the rendering field of perception in at least one dimension or wherein the observation field of perception is less than the rendering field of perception in all dimensions.

5. An apparatus as claimed in claim 1, wherein the content for rendering is a still image, the method comprising using the combination of the user perception direction and the observation field of perception over the cumulative viewing time to define restricted content of the still image.

6. An apparatus as claimed in claim 1, wherein the content for rendering comprises time-varying content, the method comprising using a combination of the user perception direction and the observation field of perception at a first relative time to define restricted content of the time-varying content for subsequent relative times, wherein the apparatus is further caused to:
  use a combination of a user perception direction at a second relative time, subsequent to the first relative time, and the rendering field of perception to define content for rendering at the second relative time;
  render in a first state at the second relative time any portion of the content for rendering that is not defined as restricted content and rendering in a second state at the second relative time, different to the first state, any portion of the content for rendering that is defined as restricted content; and
  use a combination of the user perception direction at the second relative time and the observation field of perception to enable re-definition of the restricted content for relative times subsequent to the second relative time.

7. An apparatus as claimed in claim 1, wherein the content for rendering is visual image content comprising time-varying images at different relative times, the method comprising using a combination of the user perception direction and an observation field of perception at a relative time to define restricted content of the still image at that time only and no other relative time.

8. An apparatus as claimed in claim 1, further caused to use a combination of the user perception direction and an observation field of perception to define observed content, wherein each rendering up to and including an Nth rendering of observed content is in the first
  state amd each rendering after and including an (N-F1)th rendering of the observed content is in the second state.

9. An apparatus as claimed in claim 1, further caused to use the combination of a user perception direction and an observation field of perception to define observed content, wherein a first rendering of the observed content is in the first state and any subsequent rendering of the observed content is in the second state.

10. An apparatus as claimed in claim 1, wherein the perception direction is a direction of user orientation or a direction of user gaze.

11. An apparatus as claimed in claim 1, further caused to use:
  use a combination of a user perception direction and a display field of view to define visual content for display;
  display in a first state any portion of the visual content for display that is not defined as restricted visual content and display in a second state, different to the first state, any portion of the visual content for display that is defined as restricted content; and
  use a combination of the user perception direction and an observation field of view to define observed content, wherein the definition of observed content is used to enable re-definition of the restricted content for subsequent use, wherein the visual content is static and does not vary in time, or
use a combination of the user perception direction at a first relative time and a display field of view at a first relative time to define visual content for display at the first time;
display in a first state at the first relative time any portion of the visual content for display that is not defined as restricted visual content at the first relative time and display in a second state at the first time, different to the first state, any portion of the visual content for display that is defined as restricted visual content at the first relative time; and
use a combination of the user perception direction and an observation field of view to define observed visual content at the first relative time, wherein the definition of observed content at the first relative time is used to enable re-definition of the restricted content at the first relative time for subsequent use, wherein the visual content is variable and varies in time.

12. An apparatus as claimed in claim 1, further caused to use:
  use a combination of the user perception direction at a first relative time and a front field of hearing to define sound content for rendering at the first time;
  render in a first state at the first relative time any portion of the sound content for rendering that is not defined as restricted sound content for the first relative time and render in a second state at the first time, different to the first state, any portion of the sound content for rendering that is defined as restricted sound content for the first relative time; and
  use a combination of the user perception direction and a front field of hearing to define observed sound content at the first relative time, wherein the definition of observed sound content at the first relative time is used to enable re-definition of the restricted sound content at the first relative time for subsequent use, wherein the sound content is variable and varies in time.

13. A method comprising:
rendering for a user, in a first state, a first portion of content for rendering that is not defined as restricted content and rendering simultaneously, in a second state, different to the first state, a second portion of the content for rendering that is defined as restricted content, wherein the second portion of the content is rendered in the second state based on having been previously observed by the user a predefined number of times during a particular time slice of the content or having been previously observed by the user for a predefined cumulative viewing time during the particular time slice of the content;
wherein the restricted content comprises only a portion of all rendered content;
wherein the second state in which the second portion of the content is rendered provides for persistently obscuring, removing, de-focusing, blurring, rendering at a lower volume, muting or otherwise modifying the second portion of the content, while the content is subsequently viewed during the particular time slice, to contain less information relative to the first portion of the content; and
using a combination of a user perception direction and an observation field of perception to define restricted content.

14. A method as claimed in claim 13, comprising using a combination of the user perception direction and a rendering field of perception to define the content for rendering.

15. A method as claimed in claim 14, wherein the rendering field of perception is one of multiple different rendering fields of perception that overlap to cover a visual scene that extends in a horizontal plane for at least 180° and in a vertical plane for at least 60°.

16. A method as claimed in claim 13, wherein the observation field of perception is less than the rendering field of perception in at least one dimension or wherein the observation field of perception is less than the rendering field of perception in all dimensions.

17. A method as claimed in claim 13, wherein the content for rendering is a still image, the method comprising using the combination of the user perception direction and the observation field of perception over the cumulative viewing time to define restricted content of the still image.

18. A non-transitory computer readable medium comprising program instructions stored thereon for performing at least the following:

render for a user, in a first state, a first portion of content for rendering that is not defined as restricted content and render simultaneously, in a second state, different to the first state, a second portion of the content for rendering that is defined as restricted content, wherein the second portion of the content is rendered in the second state based on having been previously observed by the user a predefined number of times during a particular time slice of the content or having been previously observed by the user for a predefined cumulative viewing time during the particular time slice of the content;

wherein the restricted content comprises only a portion of all rendered content;

wherein the second state in which the second portion of the content is rendered provides for persistently obscuring, removing, de-focusing, blurring, rendering at a lower volume, muting or otherwise modifying the second portion of the content, while the content is subsequently viewed during the particular time slice, to contain less information relative to the first portion of the content; and use a combination of a user perception direction and an observation field of perception to define restricted content.

* * * * *

UNITED STATES PATENT AND TRADEMARK OFFICE
CERTIFICATE OF CORRECTION

PATENT NO. : 11,868,520 B2
APPLICATION NO. : 16/487596
DATED : January 9, 2024
INVENTOR(S) : Niko Saarnisto et al.

It is certified that error appears in the above-identified patent and that said Letters Patent is hereby corrected as shown below:

In the Claims

In Column 17, Line 47, Claim 8, delete "amd" and insert -- and --, therefor.

In Column 17, Line 47, Claim 8, delete "(N-F1)th" and insert -- (N+1)th --, therefor.

Signed and Sealed this
Twelfth Day of March, 2024

Katherine Kelly Vidal
*Director of the United States Patent and Trademark Office*